UNITED STATES PATENT OFFICE 2,499,924

HIGH VISCOSITY POLYVINYL ALCOHOL

Edward Lavin, Springfield, Mass., assignor to Shawinigan Resins Corporation, Springfield, Mass., a corporation of Massachusetts No Drawing. Application November 20, 1946, Serial No. 711,207

4 Claims. (Cl. 260—91.3)

This invention relates to a process for preparing polyvinyl alcohols having high viscosities.

Hydrolyzed polyvinyl acetates are useful for many purposes. However, for some uses e. g., as thickening agents, protective colloids and the like, it is desirable that such materials possess materially higher viscosities.

It is an object of this invention to provide a process for preparing partially hydrolyzed polyvinyl acetates having an unusually high viscosity. A particular object of this invention is to provide a process for preparing high viscosity polyvinyl alcohols having an acetate content of 15–40 per cent by weight, calculated as polyvinyl acetate.

These and other objects are accomplished according to this invention by hydrolyzing polyvinyl acetate in a solvent mixture comprising methanol and a hydrocarbon from the group consisting of benzene, xylene, and toluene, the methanol content of such solvent mixture being in the range 3–25 per cent by weight. Surprisingly, it is discovered that when polyvinyl acetate is hydrolyzed under such conditions until the acetate content calculated as polyvinyl acetate is in the range 15–40 per cent on a weight basis, aqueous solutions of the hydrolyzed product possesses viscosities far in excess of those normally encountered.

The following examples are illustrative of the process of this invention. Where parts are mentioned, they are parts by weight.

The process employed in preparing the products set forth in the examples in Tables A and B comprises dissolving the polyvinyl acetate in the toluene and then adding the methanol containing the sulfuric acid (98% $H_2SO_4$) dissolved therein. The charge is prepared in a suitable apparatus provided with an agitator and a water-cooled return condenser. The hydrolysis is carried out by heating the charge at its reflux temperature and continuing the heating under these conditions until the desired degree of hydrolysis is effected. The reaction mixture is then cooled and the hydrolyzed product which is in the form of a precipitate is allowed to settle. Thereafter the supernatant liquid is decanted and the precipitate washed with methyl acetate to further remove solvent, thereby hardening the granular product. The product is then washed several times with a mixture of methyl acetate and methyl alcohol and neutralized by a treatment with a N/10 aqueous solution of sodium hydroxide while slurried with a mixture of methyl acetate and methyl alcohol, until the liquid in contact therewith is neutral to brom-thymol blue. The product is separated from the liquor, washed again with methyl acetate and dried at 50–60° C.

In the tables the designation V60 indicates that the polyvinyl acetate is polymerized to such a degree that a 1 molar benzene solution thereof has a viscosity of 60 centipoises at 20° C. The designation V15 indicates a viscosity of 15 centipoises under the same conditions.

Table A

| Example | 1 | 2 | 3 |
|---|---|---|---|
| Type of Polyvinyl Acetate | V60 | V60 | V60. |
| Percent Methanol in Toluene-Methanol Solvent | 10.0 | 5.0 | 9.9. |
| Percent Polyvinyl Acetate in Charge | 10.0 | 10.0 | 10.0. |
| Percent Sulfuric Acid (98% $H_2SO_4$) in Charge | 1.0 | 1.0 | 0.25. |
| Percent Acetate in Hydrolysis Product Calculated as Polyvinyl Acetate | 25.3 | 29.6 | 28.6. |
| Viscosity of 4% Solution of Product in Water at 20° C | 250,000 cp | incompletely soluble. | 630 cp. |

Table B

| Example | 4 | 5 | 6 | 7 |
|---|---|---|---|---|
| Type of Polyvinyl Acetate | V15 | V15 | V15 | V15. |
| Percent Methanol in Toluene-Methanol Solvent | 10.6 | 11.3 | 14.9 | 17.4. |
| Percent Polyvinyl Acetate in Charge | 15.0 | 20.0 | 20.0 | 30.0. |
| Percent Sulfuric Acid (98% $H_2SO_4$) in Charge | 1.0 | 1.0 | 1.0 | 1.0. |
| Percent Acetate in Hydrolysis Product Calculated as Polyvinyl Acetate | 20.8 | 31.2 | 19.1 | 31.8. |
| Viscosity of 4% Solution of Product in Water at 20° C | 2,720 cp | incompletely soluble | 525 cp | >250,000 cp. |

In contrast to the results obtained according to this invention as exemplified by the examples in Tables A and B, if corresponding polyvinyl acetates are hydrolyzed in the usual manner, for example, under acid or alkaline conditions in the presence of an alkanol such as methanol or ethanol, the products have viscosities in the range 20-30 centipoises when measured under the same conditions as set forth in Tables A and B.

In place of toluene-methanol mixtures, benzene-methanol mixtures may be used as shown by the following example:

Example 8

|   | Parts |
|---|---|
| Polyvinyl acetate (V60) | 100 |
| Benzene | 810 |
| Methanol | 90 |
| Sulfuric acid (98% H₂SO₄) | 10.0 |

The hydrolysis is carried out as in Examples 1-7 except that benzene is substituted for toluene. The product is worked up in the same manner.

The product has an acetate content calculated as polyvinyl acetate of 24.8% and a 4% aqueous solution has a viscosity of 1275 centipoises at 20° C.

Xylene-methanol mixtures may also be used as the hydrolyzing medium to produce polyvinyl alcohols having usually high viscosities although the products are not characterized by the exceptionally high viscosities obtained with toluene.

Numerous variations may be introduced into the process of the invention as exemplified by the foregoing examples. Thus, the methanol content of the solvent mixture may be varied from about 3 to 25 per cent. Usually more than five per cent is to be preferred when soluble products are desired and for extremely high viscosities the methanol content is preferably not over 15 per cent. Thus, for most purposes a methanol content of about 5-15 per cent is very desirable.

The polyvinyl acetate employed may be widely varied as to its method of preparation. Thus, polyvinyl acetates prepared by polymerization in mass, in solution in such a solvent as benzene or toluene or while suspended or emulsified in an aqueous medium may be used. The polyvinyl acetates used in the examples are prepared by polymerizing vinyl acetate in solution in benzene using acetyl peroxide as the catalyst. As shown by the examples, polyvinyl acetate of widely varying viscosities may be used, for example, 1-molar benzene solutions thereof may possess viscosities of from 2-500 or more centipoises at 20° C.

The temperature at which the hydrolysis is carried out may be substantially varied. However, in order to expedite the reaction, temperatures above room temperature are usually preferred and by operating in a closed system, temperatures above the boiling point of the reaction mixture may be used e. g., up to 150° C. or higher.

The ratio of the solvent mixture to the polyvinyl acetate in the hydrolysis charge may be substantially varied but usually it is preferred that the charge have a solids content of 5-40 per cent by weight.

It is to be understood that the amount of solvent should be so correlated with the proportion of methanol in the solvent that sufficient methanol is present to produce the desired degree of hydrolysis.

Usually, a sulfuric acid content of at least 0.1% based on the total charge is desirable but, for most purposes, a sulfuric acid content of over 2% is not advantageous.

It has further been discovered that the stability of the polyvinyl alcohols made according to the invention may be enhanced by alkali treatment. Thus, the tendency of these polyvinyl alcohols to discolor and become insoluble on heating the dry product and to undergo a sharp reduction in viscosity on heating aqueous solutions thereof, is vastly reduced by such treatment. The effect of such treatment is illustrated by the examples in Table C in which the effect of treating the product in Example 4 with varying amounts of potassium acetate is shown.

The procedure followed is to add 10 gram samples of the polyvinyl alcohol to 100 cc. of a methanol solution of potassium acetate containing the specified amount of potassium acetate and then stir the resulting mixture at room temperature for one hour. The product is separated from the alkaline liquor, washed with methanol and dried at a moderately elevated temperature, e. g., 50-60° C.

Table C

| Example | 4 | 4A | 4B | 4C | 4D | 4E |
|---|---|---|---|---|---|---|
| Mols of Potassium Acetate per 1000 cc. of Methanol Solution | none | 0.01 | 0.075 | 0.1 | 0.2 | 0.5 |
| "Alkali Titer"¹ of Product | 0.15 | 1.0 | 5.0 | 7.5 | 18.0 | 45.0 |
| Viscosity of 4% Solution of Product in Water at 20° C. | 2,720 | 6,040 | 6,550 | 3,750 | 3,480 | slightly insoluble |
| Color of Product After Heating at 150° C. for 1 Hour. | Deep brown | Deep Brown | Light Tan | Tan | Light Brown | Deep Brown |

¹ "Alkali titer" —Number of cubic centimeters of N/100 HCl required to neutralize 10 grams of a 4% aqueous solution of the resin using brom-phenol blue indicator.

From the results in Table C, it is readily seen that treatment with potassium acetate markedly improves the resistance to discoloration on heating, particularly in view of the fact that the product of Example 4 is light tan initially and after treatment as in Example 4B, retains its initial color even after heating at 150° C. for 1 hour.

In addition, heating 4% aqueous solutions of the product of Example 4 as compared with the product treated as in Example 4B shows the greatly improved stability of the alkali treated product. These results are given below.

| Example | 4 | 4B |
|---|---|---|
|  | Cp. | Cp. |
| Initial Viscosity | 2,720 | 6,560 |
| Viscosity after 2 hours at 70° C | 325 | 2,675 |
| Viscosity after 4 hours at 70° C | 180 | 2,595 |

Thus, it is to be noted that the product in Example 4 shows a progressive decrease in viscosity whereas the product in Example 4B even after 4 hours heating is substantially that of the product in Example 4 before heating.

Example 9

Following the procedure used in Examples 1-7, a high viscosity polyvinyl alcohol is made from the following charge:

| | Parts |
|---|---|
| Polyvinyl acetate (V60) | 150 |
| Toluene | 1200 |
| Methanol | 135 |
| Sulfuric acid (98% $H_2SO_4$) | 15 |

The hydrolysis is continued until the acetate content of the product calculated as polyvinyl acetate is reduced to 23.2%. The product, after washing, neutralizing, and drying as in the previous examples, is found to require 0.5 cc. of N/100 HCl to neutralize 10 grams of a 4% aqueous solution to brom-phenol blue.

A 2% aqueous solution of the product has a viscosity of 38 centipoises at 20° C. After heating the dry product for 1 hour at 150° C., it is found to be insoluble in water and to be brown in color.

In contrast to these characteristics, after treatment of 10 grams of the product with 100 cc. of a 0.04 molar solution of potassium acetate in methanol for 1 hour at room temperature, 3.6 cc. of N/100 HCl are required to neutralize 10 grams of a 4% aqueous solution to brom-phenol blue and a 2% aqueous solution has a viscosity of 44 centipoises at 20° C. After heating the product for 1 hour at 150° C., a 2% aqueous solution thereof has a viscosity of 45 centipoises at 20° C. and substantially all of the product is white in color.

In place of potassium acetate, other alkaline materials may be used such as potassium hydroxide, potassium carbonate, the corresponding sodium compounds, quaternary ammonium bases such as tetraethyl ammonium hydroxide, alkylol amines, e. g., triethanolamine, tetraethanol amine, etc. Usually, sufficient alkali is used to produce at least a 0.02 molar solution and a 0.02-0.2 molar solution results in maximum color stability.

In place of methanol, other nonsolvent liquid compounds containing hydroxyl groups may be used in stabilizing the polyvinyl alcohols of the invention. For example, lower aliphatic alcohols, such as ethanol, propanol, butanol, pentanol, etc. and mixtures of two or more of such compounds may be used. Water may also be present, provided insufficient is used to cause the polyvinyl alcohol to dissolve.

The polyvinyl alcohols of the invention are found to be useful as suspending agents in the aqueous suspension polymerization of vinyl compounds. Thus, granular products are obtained by polymerizing vinyl acetate in aqueous suspension using the product of Example 1 as the suspending agent. Concentrations of the polyvinyl alcohol (based on the water) of 0.01-0.15% are found to be suitable for this purpose, the lower concentrations yielding rather coarse-grained products and the higher concentrations very fine grains.

In the preparation of emulsions, the products of the invention are found to act as thickening agents. Thus, 1-5% of a polyvinyl alcohol of the invention such as that illustrated by Example 1 serves to increase greatly the viscosity of polyvinyl acetate emulsions.

The foregoing description is given in illustration and not in limitation of the invention as set forth in the appended claims.

What is claimed is:

1. A process for preparing high viscosity polyvinyl alcohol which comprises hydrolyzing polyvinyl acetate by treatment with a catalytic amount of sulfuric acid while dissolved in a mixture of methanol and a hydrocarbon selected from the group consisting of benzene, toluene, and xylene, said mixture containing 3-25% methanol by weight, and the balance being the hydrocarbon, and continuing the hydrolysis until the acetate content of the polyvinyl acetate is reduced to 15-40% by weight calculated as polyvinyl acetate.

2. A process as defined in claim 1 in which the polyvinyl acetate content of the charge is in the range 5-40%, by weight, the methanol content of the solvent mixture is in the range 5-15%, by weight, and the balance being the hydrocarbon, and the sulfuric acid content of the charge is in the range of 0.1-2%, by weight.

3. A process for preparing high viscosity polyvinyl alcohol which comprises hydrolyzing polyvinyl acetate by treatment with a catalytic amount of sulfuric acid while dissolved in a mixture of methanol and toluene, said mixture containing 3-25% methanol and 97-75% toluene by weight and continuing the hydrolysis until the acetate content of the polyvinyl acetate is reduced to 15-40% by weight calculated as polyvinyl acetate.

4. A process as defined in claim 3 in which the polyvinyl acetate content of the charge is 5-40% by weight, the methanol content of the solvent is in the range 5-15% by weight and the balance being the hydrocarbon, and the sulfuric acid content of the charge is in the range 0.1-2%, by weight.

EDWARD LAVIN.

REFERENCES CITED

The following references are of record in the file of this patent:

UNITED STATES PATENTS

| Number | Name | Date |
|---|---|---|
| 2,226,075 | Rowe | Dec. 24, 1940 |
| 2,227,997 | Berg | Jan. 7, 1941 |
| 2,266,996 | Scott et al. | Dec. 23, 1941 |
| 2,356,282 | Stamatoff | Aug. 22, 1944 |